Jan. 29, 1957 W. L. JOHNSON 2,779,090
TOOL FOR REMOVING AND INSTALLING VEHICLE FANS
Filed Sept. 18, 1953
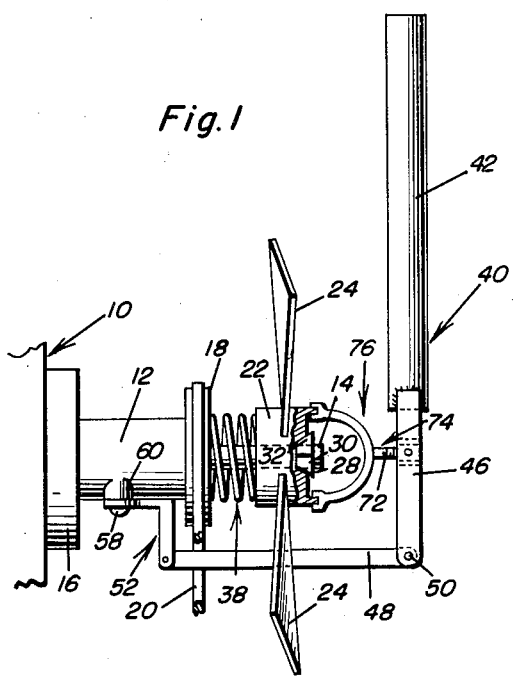
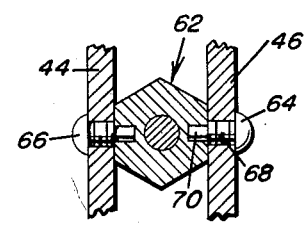
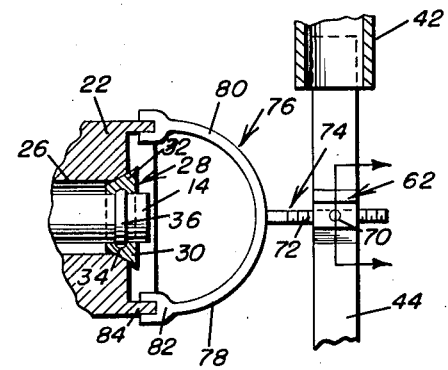
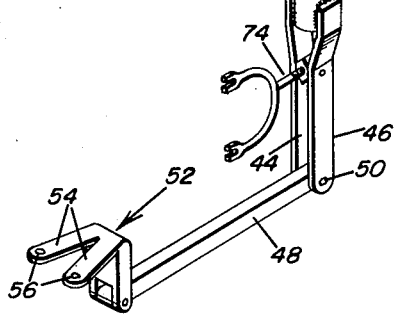
Walter L. Johnson
INVENTOR.

United States Patent Office 2,779,090
Patented Jan. 29, 1957

2,779,090

TOOL FOR REMOVING AND INSTALLING VEHICLE FANS

Walter L. Johnson, Kimball, S. Dak.

Application September 18, 1953, Serial No. 380,966

1 Claim. (Cl. 29—267)

This invention relates generally to accessory tools for tractors and pertains more particularly to a unit for aiding in the removal and installation of tractor fans.

A primary object of this invention is to provide a novel and improved tool mechanism particularly adapted for use in conjunction with John Deere tractors for aiding and expediting the compression of the fan hub retaining spring utilized therein such that the fan and its associated hub may be readily removed from the tractor.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view showing the tool in use;

Figure 2 is a perspective view of the tool;

Figure 3 is a vertical partial section on enlarged scale showing details of the tool and the associate fan hub construction; and Figure 4 is an enlarged sectional view taken substantially on the plane of section line 4—4 in Figure 3.

Referring now more particularly to the drawings, the reference numeral 10 indicates generally an internal combustion engine cylinder block, a portion thereof only being shown, and the reference character 12 indicates a bearing support for a fan shaft 14, the support being provided with a flanged portion 16 so as to be removably secured to the engine block 10. A driving pulley 18 is suitably threaded to the shaft 14 and is adapted to receive a fan belt 20 driven from the crankshaft pulley in a conventional manner. Reference numeral 22 indicates a fan hub which is provided on its outer surface with a series of circumferentially spaced fan blades 24 and which is provided with an enlarged longitudinal bore 26 having an outwardly beveled end portion in the manner shown most clearly in Figures 1 and 3. The bore 26 is of larger diameter than the shaft 14 and the beveled portion of this bore is adapted to be urged into frictional engagement with the tapered surface of a collar assembly indicated generally by the reference character 28, and which includes a pair of semi-circular elements 30 and 32, each of which is provided with an arcuate groove 34 on its inner surface for engagement with a snap ring 36 engaged within a groove provided adjacent the end of the shaft 14. The frictional engagement is accomplished by the action of a compression coil spring 38 which is interposed between the rear surface of the hub 22 and the forward surface of the pulley member 18. The above described construction is conventional in nature and is of the general type utilized currently in John Deere tractors.

With reference now more particularly to Figures 1 and 2, it will be noted that the tool assembly incorporates a lever member indicated generally by the reference character 40 which is divided into two sections or portions, namely, a handle portion 42 and an extension portion at one end of the handle portion which embodies a pair of arm members 44 and 46 securely fastened to the handle portion and disposed in spaced parallel relation in the manner shown. A link 48 is pivotally secured as by pin 50 to the free ends of the arm members 44 and 46, the link being disposed between the arms in the manner shown. At the opposite end of the link there is provided a bracket assembly indicated generally by the reference character 52 which includes a pair of dovetail ear elements 54 each having an aperture 56 therein for the reception of fastening elements 58 as shown most clearly in Figure 1. These ears and their apertures 56 are so formed as to register with threaded apertures in a pair of bosses 60 provided on the undersurface of the bearing support 12. It is to be realized that in order to utilize the tool it is necessary to remove the accessory supported normally by these boss portions.

As seen most clearly in Figures 2 and 4, a sleeve member indicated generally by the reference character 62, which may conveniently take the form of a nut of hexagonal configuration such that its opposite sides may be disposed in abutting relation to the arms 44 and 46, is disposed therebetween. Trunnion pin members 64 and 66 including threaded shank portions 68 and free end journaled portions 70 are threadedly received in suitable apertures in the arms 44 and 46 and recesses in the opposite sides of the nut member 62 receive these bearing portions 70 such that the nut member is trunnioned thereby between the arms.

The nut member includes a threaded bore which receives the threaded shank portion 72 of a pressure foot assembly, indicated generally by the reference character 74, and it will be noted that this shank portion is threaded throughout a substantial extent of its length so that the tool may be adapted in effective size to the corresponding condition of removal or installation. The pressure foot also includes a semi-circular yoke portion indicated generally by the reference character 76 integral with the shank 72 and which presents a pair of spaced leg members 78 and 80 terminating at their ends in the enlarged portions 82 which are notched in the manner shown to straddle and seat upon the peripheral flange 84 in the fan hub member 22.

When utilizing the tool for the removal or installation of a tractor fan, it is merely necessary to remove the radiator from the associated tractor and bolt the bracket assembly 52 to the previously described boss portions 60 after removing the accessory which is normally attached thereto. Then, the shank 72 of the pressure foot assembly 74 is adjusted relative to the nut member 62 in such a manner that the handle portion 42 of the lever assembly is properly positioned to clear all obstructions within the engine department of the tractor so that when the tool handle is drawn toward the rear of the tractor engine, the hub 22 will be slid longitudinally on the shaft 14 to permit either the removal or installation of the members 30 and 32.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is:

A tool for removing and installing tractor fans comprising, an elongated lever member, said member including a handle portion and a pair of spaced arms forming an extension at one end of said handle portion, a link pivotally received at one end between the free ends of said arms, an attaching bracket pivotally secured at the other end of said link adapted for attachment to the bearing support of a tractor fan shaft, a sleeve member disposed between said arms adjacent the point of juncture of said arms and said handle portion of the lever member, a pin threadedly engaged with each of said arms, said pins including inner end portions projecting within said sleeve member and providing a trunnion support therefor, said sleeve having a threaded bore, and a pressure foot including a threaded shank portion received in said bore and a semi-circular yoke portion presenting a pair of spaced legs, each terminating in a notched portion defining a foot for straddling the rim of a tractor fan hub.

References Cited in the file of this patent

UNITED STATES PATENTS

| | | |
|---|---|---|
| 1,268,480 | Lockwood | June 4, 1918 |
| 1,517,423 | Hanson | Dec. 2, 1924 |
| 1,621,237 | Davis | Mar. 15, 1927 |
| 1,734,420 | Curtis | Nov. 5, 1929 |